United States Patent [19]

Corpora et al.

[11] Patent Number: 5,139,734
[45] Date of Patent: Aug. 18, 1992

[54] RESIN PROCESSING SYSTEM

[75] Inventors: Gary J. Corpora; James S. Schlonski, both of Monroeville; Phillip E. Miller, Greensburg; Frank I. Bauer, Perry Township, Laurence County, all of Pa.

[73] Assignee: Westinghouse Electric Corp., Pittsburgh, Pa.

[21] Appl. No.: 621,130

[22] Filed: Nov. 26, 1990

[51] Int. Cl.$^5$ .............................................. G21C 19/42
[52] U.S. Cl. ........................... 376/310; 376/313; 210/264
[58] Field of Search ............... 376/305, 306, 310, 308, 376/309, 313; 210/264, 284; 422/903

[56] References Cited

U.S. PATENT DOCUMENTS

| | | | |
|---|---|---|---|
| 2,767,140 | 10/1956 | Fitch | 210/676 |
| 3,923,460 | 12/1975 | Parrott et al. | 210/264 |
| 3,928,192 | 12/1975 | Katzakian, Jr. et al. | 210/24 |
| 3,976,541 | 8/1976 | Stiteler et al. | 376/310 |
| 4,049,548 | 9/1977 | Dickerson | 210/24 |
| 4,228,013 | 10/1980 | Degenkolb et al. | 210/264 |
| 4,383,920 | 5/1983 | Muller et al. | 210/87 |
| 4,587,043 | 5/1986 | Murray et al. | 252/626 |

OTHER PUBLICATIONS

J. X. Khym, "Analytical Ion-Exchange Procedures in Chemistry and Biology", 1974, pp. 86–96.

Primary Examiner—Brooks H. Hunt
Assistant Examiner—Ngoclan T. Mai
Attorney, Agent, or Firm—M. G. Panian

[57] ABSTRACT

A unique resin processing system for providing and removing resin to large demineralizer vessels during chemical decontamination of nuclear reactor primary systems is disclosed. Resin is premeasured in a batching tank for accurate filling of demineralilzer resin bed while minimizing personnel radioactivity exposure. Sluice water transfers spent resin to a storage tank and, thereafter, is recycled for subsequent sluicing operations. Spent resin from the storage tank is periodically delivered to high integrity containers for ultimate disposal.

12 Claims, 1 Drawing Sheet

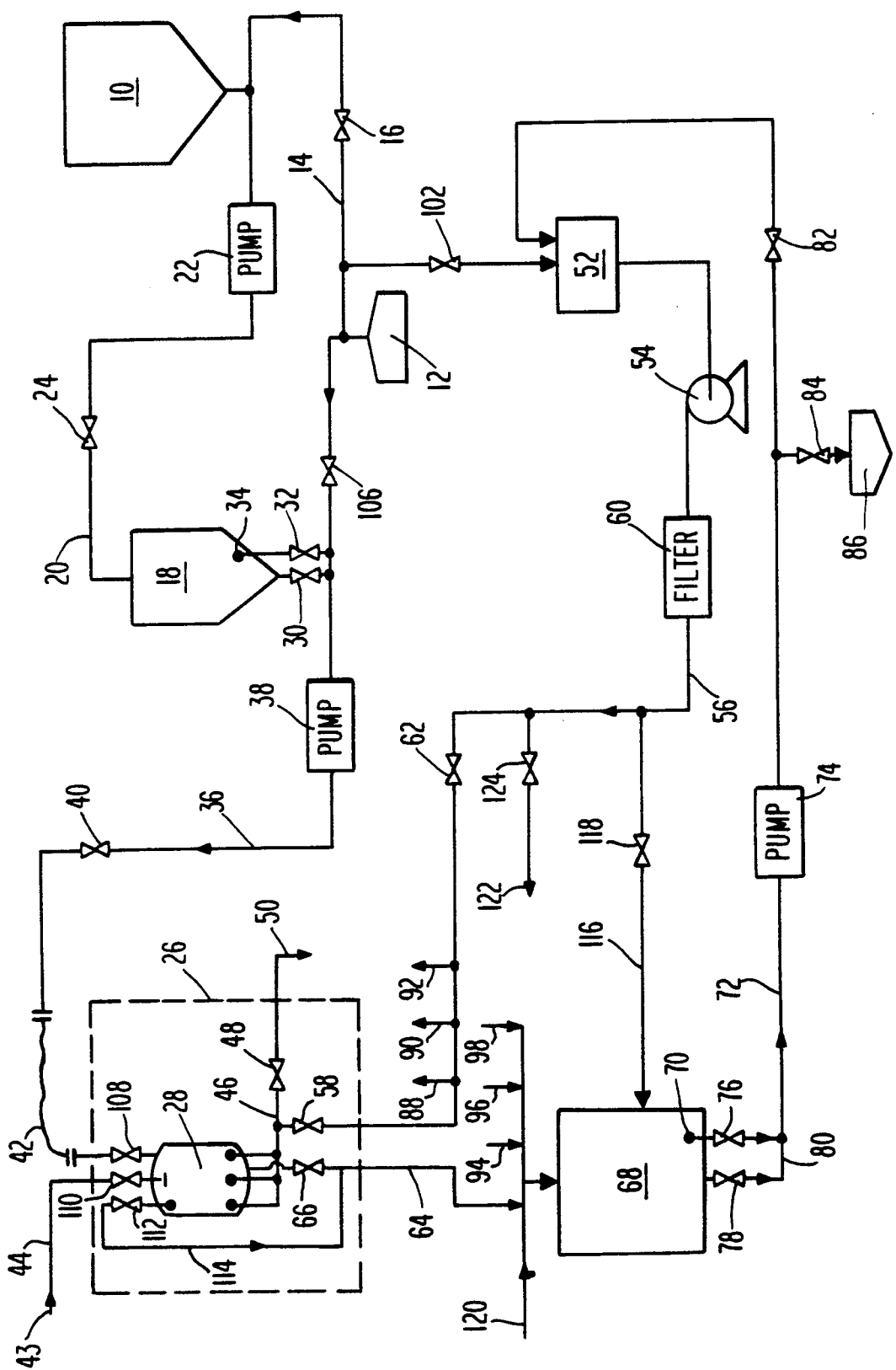

RESIN PROCESSING SYSTEM

BACKGROUND OF THE INVENTION

1. Field Of The Invention

The present invention relates to the field of decontamination of nuclear reactor primary systems. More specifically, it relates to an improved method of processing resin used in chemical decontamination methods.

2. Description Of The Prior Art

The problem of excessive personnel exposures caused by high background radiation levels in a nuclear reactor primary system, such as in pressurized water reactor (PWR) systems, and the resultant economic cost of requiring personnel rotation to minimize individual exposure is significant at many nuclear plants. These background levels are principally due to the buildup of corrosion products in certain areas of the plant. The buildup of corrosion products exposes workers to high radiation levels during routine maintenance and refueling outages. The long term prognosis is that personnel exposure levels will continue to increase.

As a nuclear power plant operates, the surfaces in the core and primary system corrode. Corrosion products, referred to as crud, are activated by transport of the corroded material to the core region by the reactor coolant system (RCS). Subsequent release of the activated crud and redeposition elsewhere in the system produces radiation fields in piping and components throughout the primary system, thus increasing radiation levels throughout the plant. The activity of the corrosion product deposits is predominately due to Cobalt 58 and Cobalt 60. It is estimated that 80-90% of personnel radiation exposure can be attributed to these elements.

One way of controlling worker exposure, and of dealing with this problematic situation, is to periodically decontaminate the nuclear reactor primary system using chemicals, thereby removing a significant fraction of the corrosion product oxide films. Prior techniques had done very little to decontaminate the primary system as a whole, typically focusing only on the heat exchanger (steam generator) channel heads.

Two different chemical processes, referred to as LOMI (developed in England under a joint program by EPRI and the Central Electricity Generating Board) and CAN-DEREM (developed by Atomic Energy of Canada, Ltd.), have been used for small scale decontamination in the past. These processes are multi-step operations, in which various chemicals are injected, recirculated, and then removed by ion-exchange. Although the chemicals are designed to dissolve the corrosion products, some particulates are also generated. One method of chemical decontamination, focusing on the chemistry of decontamination, is disclosed in U.K. Patent Application No. GB 2 085 215 A (Bradbury et al.). There is little disclosure, however, of the methodology to be used in applying that chemistry to system decontamination.

While these chemical processes had typically been used on only a localized basis, use of these chemical processes has now been considered by the inventors herein for possible application on a large scale, full system chemical decontamination. Such an application is disclosed generally in co-pending Application Ser. No. 07/621,120 Nov. 26, 1990, entitled "System For Chemical Decontamination Of Nuclear Reactor Primary Systems", and incorporated herein by reference.

While some work has been done in the boiling water reactor (BWR) programs, the BWR scenarios examined by those in the field involved only decontaminating fuel assemblies in sipping cans employing commercial processes at off-normal decontamination process conditions with little regard for the effects of temperature, pressure, and flow that would be mandated by an actual application of the process to the full reactor system.

The estimated collective radiation dose savings over a 10-year period following decontamination is on the order of 3500-4500 man rem, depending upon whether or not the fuel is removed during decontamination. At any reasonable assigning of cost per man-rem, the savings resulting from reduced dose levels will be in the tens of millions of dollars.

As a result of the present examination of potential full system decontamination, and the resulting need for new sub-system methods, developments have been made by the assignor of this invention to use demineralizing resin beds in conjunction with the known chemical processes. These developments are set forth in co-pending application Ser. No. 07/621,129 filed Nov. 26, 1990, entitled "Clean-up Sub-system for Chemical Decontamination of Nuclear Reactor Primary Systems," and incorporated herein by reference. Due to the large water volume to be treated within such a full system decontamination process, an in-line clean-up sub-system using filters and demineralizers is used for efficient dissolved chemical and crud removal. However, the quantity of resin required for effective decontamination is so large that the number of demineralizer vessels that would be needed to hold the entire required amount of resin is cost-prohibitive. As a further result, a need now exists for a system to transfer fresh and spent resin from demineralizers to be used within the decontamination process. Heretofore, an in-line sub-system for removing activated crud had not been needed nor developed. The wholly new need for a system to transfer resin requires a wholly new development unanticipated by any existing art.

Accordingly, there exists a need for a method and apparatus for optimizing the delivery and use of resin within the proposed full system chemical decontamination processes.

SUMMARY OF THE INVENTION

The present invention is directed to a resin processing system for use within a chemical decontamination system for full nuclear reactor primary system decontamination. To this end, a limited number of demineralizer vessels are utilized in conjunction with a fresh resin supply tank, large enough to supply all needed resin for a particular decontamination step, and a batching tank sized to deliver an appropriate amount of fresh resin to a particular demineralizer bed when so desired.

A sluice water supply tank is utilized to supply water to each demineralizer for removal of spent resin from each such demineralizer. The spent resin is then delivered to a spent resin storage tank and the sluice water is withdrawn from the storage tank for recycling.

After a particular decontamination process step is completed, the spent resin collected within the spent resin storage tank can be removed for ultimate disposal.

Accordingly, it is an object of the present invention to provide a resin processing system to economically process resin within a chemical decontamination process to be used on nuclear reactor systems. These and further objects and advantages will be apparent to those skilled in the art in connection with the detailed description of the invention that follows.

BRIEF DESCRIPTION OF THE DRAWING

The single FIGURE is a schematic diagram illustrating the resin processing system and apparatus of the present invention.

DETAILED DESCRIPTION OF THE PREFERRED EMBODIMENTS

Because the quantity of resin required for decontamination of an entire nuclear steam supply system is so large when utilizing the known chemical decontamination technologies, it has been determined that it is economically impractical to utilize the number of demineralizer vessels that would be needed to hold the entire quantity of necessary resin. Therefore, the methods of the present invention preferably utilize a limited number of vessels in conjunction with a means for replacing the resin beds as needed within those limited number of vessels during the decontamination operation while minimizing water usage, so as not to delay operation of the chemical decontamination system. In addition to resin replacement, it is sought to minimize personnel exposure from highly radioactive resin. Thus, the primary functional requirements to be met by a resin processing system will be to replace the spent resin as quickly as practical and to minimize the personnel exposure from the highly radioactive resin. Further, the apparatus used in conjunction with the methods of the present invention should be capable of storing all of the spent resin generated under either the CAN-DEREM or LOMI processes for decay and/or disposal off of the nuclear reactor critical path.

Turning now in detail to the drawing, the FIGURE represents a schematic view of one embodiment of the apparatus utilized with the present invention. Other configurations are possible and do not affect the method and apparatus of the present invention. A fresh resin supply tank 10 is sized to hold all of the resin required for a particular chemical decontamination step. This, of course, will depend upon the number of resin beds being used within each decontamination step and the capacity of each such resin bed. In a typical example, a bank of demineralizers will contain three resin beds of approximately 165 cubic feet (4.67 cubic meters) each. Thus, the fresh resin supply tank would be sized to accommodate approximately 495 cubic feet (14 cubic meters) of resin. The time between decontamination steps is typically several hours, which allows for the bulk loading of fresh resin supply tank 10. In one preferred embodiment, fresh resin supply tank 10 is constructed with a cone shaped bottom to allow for gravity feed. The tank is arranged so that demineralized water from a demineralized water source 12 can be injected horizontally through piping 14 and valve 16 in a tee connection below the fresh resin supply tank 10. In such an arrangement, the resin will be educted from the fresh resin supply tank 10 and should be adequately mixed with the demineralized water for transport in a slurry fashion to a resin batching tank 18.

This arrangement allows for the resin to be added to the fresh resin supply tank 10 in dry form. Thus, the volume requirements of the fresh resin supply tank 10 can be determined according to the volume of the dry resin and no additional allowance need be made for the addition of water.

In a preferred embodiment, the fresh resin supply tank 10 will have a lid that can be manually opened to load the resin. Considering the large volume required for most of the processed steps, a pneumatic or other remote solids transport system may be appropriate to load the resin into the tank in a timely manner. (Typically, the resin beads are fragile and can be destroyed by use of a standard centrifugal pump with its accompanying shear action.)

The resin slurry from the fresh resin supply tank 10 is delivered to the batching tank 18 by means of piping 20 and a fresh resin pump 22. Because of the concern for resin damage, an air-operated diaphragm pump is preferred for the fresh resin pump 22. Such a pump has the ability to run dry and economically. A process isolation valve 24 can also be provided.

Normally, an operator can determine when a demineralizer is filled with resin by visual inspection through an open fill pipe. However, when used in conjunction with a nuclear reactor, this may not be practical since the equipment layout and the use in radioactive service would result in significant personnel exposure should such a visual inspection be undertaken. Thus, the resin batching tank 18 is provided as a way of calibrating the resin volume being added to a particular demineralizer bed. Therefore, the resin batching tank 18 is sized to hold one resin bed volume so that when the entire resin batching tank 18 contents are transported to a particular demineralizer 26, the resin bed tank 28 within the demineralizer 26 will be filled. (In actuality, the resin batching tank 18 is sized to hold one resin bed volume plus 50% more water in order to achieve a preferred resin to water ratio.) Using our previous example, the resin batching tank 18 volume would equal 1.5 times 165 cubic feet (4.67 cubic meters), or roughly 250 cubic feet (7.0 cubic meters). The demineralizer 26 is part of the clean-up sub-system of the nuclear reactor. One embodiment of such a clean-up sub-system is disclosed in incorporated-by-reference co-pending application Ser. No. 621,129 filed Nov. 26, 1990.

The resin batching tank 18 is provided with two outlet nozzles, 30 and 32. Outlet nozzle 32 has a retention screen 34 to allow excess water to be drained or pumped out of resin batching tank 18. Outlet nozzle 30 is used for transferring the contents of the resin batching tank 18 to a particular demineralizer 26. Once again, it is preferred that the resin batching tank 18 have a cone-shaped bottom to facilitate complete resin removal.

When a particular demineralizer 26 requires replacement of its resin, the full contents of resin batching tank 18 is transferred to that demineralizer 26 by means of piping 36 and resin feed pump 38. Resin feed pump 38 again is preferably an air-operated diaphragm pump. In addition, a process isolation valve 40 can be provided.

In order that the resin processing system using a fresh resin supply tank 10 and a resin batching tank 18 can be properly utilized, a flexible hose 42 is attached to piping 36 so that the resin can be directed to the desired demineralizer 26. The flexible hose 42 can be attached and detached from a particular demineralizer 26 and, thereby, relocated to additional demineralizers 26 if so desired. It is, of course, also possible to construct an arrangement of pipes and valves such that the resin flow can be directed to the demineralizer 26 of choice. Other variations on this delivery system would be obvious to those of ordinary skill in the art.

A typical demineralizer 26 includes a resin bed tank 28 to which process fluids 43 are fed via piping 44. The processed fluids 43, after passing through the resin bed tank 28, are removed through multiple screened outlets (for retaining resin) via piping 46 through valve 48 and return to the normal operating system through piping 50.

In accordance with one embodiment of the present invention, a sluice water supply tank 52 is used to provide sluice water to the demineralizer 26 for removal of spent resin. The sluice water is pumped from the sluice water supply tank 52 by sluice water pump 54 to the demineralizer 26 through piping 56. Valve 48 on the process fluid outlet is closed and an alternate valve 58 is opened to allow the sluice water to flow into the resin bed tank 28 countercurrently to normal process fluid flow. In addition, a sluice water filter 60 can be provided in piping 56 to prevent resin fines from clogging the inside of the demineralizer screens during the fluffing and sluicing operations. Such a sluice water filter 60 can typically be a standard cartridge filter having a 25 micron or smaller filter rating. Finally, a process isolation valve 62 can be provided in piping 56.

The spent resin is removed in slurry form from the resin bed tank 28 via piping 64 and now-open valve 66. The sluice water carrying the spent resin is directed to a spent resin storage tank 68. Excess water from this tank is drawn off through a screen 70, which acts to retain the resin, and is thereafter pumped back to the sluice water supply tank 52 for reuse on subsequent sluicing operations. In radioactive service, the sluice water must be treated as liquid rad waste prior to disposal. This treatment is costly in terms of manpower and radiation exposure. Therefore, reuse of the sluice water minimizes operating costs and offers a distinct advantage to the present invention over alternative techniques.

The drawn-off excess water is returned to the sluice water supply tank 52 by use of piping 72 and sluice water recycle pump 74.

The spent resin storage tank 68 is sized to be sufficient to hold all of the resin generated during a particular decontamination process step along with the additional water required for transport.

The spent resin storage tank 68 will normally be large enough to hold all of the resin and accompanying water from the entire decontamination process. Removal of spent resin from the spent resin storage tank 68 between decontamination steps can be accomplished by means of a second outlet from the spent resin storage tank 68 that is unscreened. Use of valves 76 and 78 in conjunction with piping 80 allows for the spent resin to be transferred by use of the sluice water recycle pump 74. Closing valve 82 while opening valve 84 allows for the redirection of the spent resin to a disposal means 86. Such a disposal means 86 will typically include one or more high integrity containers.

The method employed to provide sluice water to the demineralizer 26 and to remove spent resin from that demineralizer 26 and deliver it to the spent resin storage tank 68, can be employed with several demineralizers 26 in parallel. Thus, piping 56 can be split to be directed to such alternate demineralizers 26 via piping 88, 90, and 92. Each such demineralizer 26, would employ similar methods for removing spent resin, which would then be delivered to the spent resin storage tank 68 via piping 94, 96, and 98. In typical operation, a particular demineralizer 26 can be off-line for spent resin removal and rebatching while other demineralizers 26 are continuing in operation.

In one preferred embodiment of the present invention, various bypasses and alternative flow patterns are provided to enhance the adaptability of the present system. Thus, for example, the demineralized water source 12 can also be directed to the sluice water supply tank 52 via piping 100 and valve 102, as well as directly to the demineralizer 26 via piping 104 and valve 106. Further, flow into and out of resin bed tank 28 can be better controlled by the addition of valves 108, 110, and 112, along with a bypass piping 114. Valve 112 and piping 114 can be used in conjunction with the sluice water to fluff the resin bed prior to resin regeneration.

Sluice water can be directed from the sluice water supply tank 52 to the spent resin storage tank 68, bypassing the demineralizer 26, by use of piping 116 and valve 118.

The spent resin storage tank 68 can also be utilized to collect material from the filtrate collection tank of the chemical clean-up sub-system described in the incorporated-by-reference co-pending application Ser. No. 07/621,129 filed Nov. 26, 1990 by means of connection 120. Sluice water can be supplied to a decontamination waste tank by means of connection 122 and valve 124.

In operation, fresh resin supply tank 10 is bulk loaded during the time between decontamination steps, a period of usually several hours. Such bulk loading overcomes the problems of dealing with resin drums of modest size when large volumes are required in a short period. The resin batching tank 18 is filled from the fresh resin supply tank 10 and then the entire contents of resin batching tank 18 is transported to an individual demineralizer 26, completely filling the resin bed tank 28 with fresh resin.

Once a particular demineralizer 26 has been in use and its resin is spent, sluice water is provided from sluice water supply tank 52 to the resin bed tank 28. The sluice water washes out the spent resin and delivers it in slurry form to the spent resin storage tank 68. Excess water is thereafter recycled to the sluice water supply tank 52. When the spent resin storage tank 68 is full, or at such other convenient time, the spent resin is removed and delivered to high integrity containers or other disposal means 86.

Several advantages flow from use of the apparatus and method of the present invention. First, impact on critical path is minimized by use of the resin batching system. Personnel exposure to radioactivity is minimized while the resin bed tanks 28 are optimally filled with appropriate resin. In addition, the volume of sluice water required is minimized by recycling it for subsequent spent resin transfers.

Having thus described the invention, it is to be understood that the invention is not limited to the embodiments set forth herein for purposes of exemplification. It is to be limited only by the scope of the attached claims, including a full range of equivalents to which each claim thereof is entitled.

What is claimed is:

1. A resin processing system for use in chemical decontamination of nuclear reactor primary systems comprising:

a fresh resin supply tank at least large enough to hold sufficient resin for performing a particular decontamination step;

a batching tank sized to hold an amount of resin mixed with water sufficient to fill a single demineralizer resin bed;

a fresh resin pump connected to the fresh resin supply tank and the batching tank capable of transporting fresh resin from the fresh resin supply tank to the batching tank;

a plurality of demineralizers wherein process fluids are demineralized;

a resin feed pump connected to the batching tank capable of transporting fresh resin from the batching tank to demineralizer resin bed;

a movable connection means connecting the resin feed pump to one of the plurality of demineralizers;

a sluice water supply tank;

a sluice water pump connected to the sluice water supply tank and the plurality of demineralizers capable of pumping sluice water to each of the plurality of demineralizers;

a spent resin storage tank connected to each of said plurality of demineralizers to receive sluice water and spent resin from the demineralizers;

a recycle pump connected to an outlet of the spent resin storage tank and having a pump outlet connected to the sluice water supply tank; and a screen at the outlet of the spent resin storage tank to retain spent resin within the spent resin storage tank while allowing sluice water to be recycled.

2. The resin processing system of claim 1 wherein one or more of the fresh resin pump, the resin feed pump, and the recycle pump are air-operated diaphragm pumps.

3. The resin processing system of claim 1 further comprising a sluice water filter located between the sluice water pump and the plurality of demineralizers.

4. The resin processing system of claim 1 further comprising:

a second, unscreened outlet in the spent resin storage tank connected to the recycle pump;

disposal means connected to the pump outlet of the recycle pump; and means for selectively directing material pumped by the recycle pump to either the sluice water supply tank or to the disposal means.

5. The resin processing system of claim 1 wherein a filtrate collection tank of a chemical decontamination sub-system of the nuclear reactor primary system is connected to the spent resin storage tank.

6. The resin processing system of claim 1 wherein the sluice water supply tank and the sluice water pump are connected to a contamination waste tank of the nuclear reactor primary system.

7. A nuclear reactor having a primary system wherein the primary system has a chemical decontamination sub-system including a resin processing system comprising:

a fresh resin supply tank at least large enough to hold sufficient resin for performing a particular decontamination step;

a batching tank sized to hold an amount of resin mixed with water sufficient to fill a single demineralizer resin bed;

a fresh resin pump connected to the fresh resin supply tank and the batching tank capable of transporting fresh resin from the fresh resin supply tank to the batching tank;

a plurality of demineralizers wherein process fluids are demineralized;

a resin feed pump connected to the batching tank capable of transporting fresh resin from the batching tank to demineralizer resin bed;

a movable connection means connecting the resin feed pump to one of the plurality of demineralizers;

a sluice water supply tank;

a sluice water pump connected to the sluice water supply tank and the plurality of demineralizers capable of pumping sluice water to each of the plurality of demineralizers;

a spent resin storage tank connected to each of said plurality of demineralizers to receive sluice water and spent resin from the demineralizers;

a recycle pump connected to an outlet of the spent resin storage tank and having a pump outlet connected to the sluice water supply tank; and a screen at the outlet of the spent resin storage tank to retain spent resin within the spent resin storage tank while allowing sluice water to be recycled.

8. The nuclear reactor of claim 7 wherein one or more of the fresh resin pump, the resin feed pump, and the recycle pump are air-operated diaphragm pumps.

9. The nuclear reactor of claim 7 wherein the resin processing system further comprises a sluice water filter located between the sluice water pump and the plurality of demineralizers.

10. The nuclear reactor of claim 7 wherein the resin processing system further comprises:

a second, unscreened outlet in the spent resin storage tank connected to the recycle pump;

disposal means connected to the pump outlet of the recycle pump; and means for selectively directing material pumped by the recycle pump to either the sluice water supply tank or to the disposal means.

11. The nuclear reactor of claim 7 wherein a filtrate collection tank of the chemical decontamination sub-system is connected to the spent resin storage tank.

12. The nuclear reactor of claim 7 wherein the sluice water supply tank and the sluice water pump are connected to a decontamination waste tank of the chemical decontamination sub-system.

* * * * *